Sept. 28, 1948.    W. M. PICKSLAY    2,450,159
CONTROL SYSTEM
Filed Aug. 14, 1944

Inventor
William M. Pickslay
by Harold S. Silver
Attorney

Patented Sept. 28, 1948

2,450,159

UNITED STATES PATENT OFFICE 2,450,159

CONTROL SYSTEM

William M. Pickslay, Milwaukee, Wis., assignor to Allis-Chalmers Manufacturing Company, Milwaukee, Wis., a corporation of Delaware Application August 14, 1944, Serial No. 549,373

27 Claims. (Cl. 314—75)

This invention relates in general to control systems utilizing a generator as a regulator and relates particularly to the utilization of such a regulating generator in a system of control wherein the terminal voltage of the regulating generator is zero when the regulated quantity is at the desired normal value.

In Patent No. 2,335,784, granted November 30, 1943, to Terryl B. Montgomery, John F. Sellers and William M. Pickslay, a control system is disclosed utilizing a regulating generator having a variable terminal voltage when the regulated quantity is normal. A regulating generator having characteristics as disclosed in the above patent is not applicable in a control system where the terminal voltage of such generator is zero when the regulated quantity is normal.

It is therefore an object of the present invention to provide a control system with a regulating generator that will satisfactorily regulate when the generator terminal voltage is zero when the regulated quantity is normal.

In prior art control systems for controlling the position of an electrode in an arc furnace, variable voltage control of the electrode motor has been suggested for the purpose of avoiding contactors in the electrode motor circuit. The variable voltage generators of such systems were responsive to arc current balanced against a constant bias. This resulted in a regulating response that is not as rapid as is desirable and further caused undesirable regulating changes to be effected in some phases due to a sudden current change in another phase. Other prior art systems suggested the use of the difference between arc current and arc voltage for initiating a regulating change. These systems utilized a differential relay, the contactors of which closed upon a given small differential to cause a regulating change. Such systems effected operation of the electrode motor at a constant speed and also permitted undesirable regulating changes in some phases because of sudden changes in current in other phases.

It is therefore an object of the present invention to provide an arc furnace control system avoiding the above disadvantages and providing a new cooperation of control system elements whereby undesirable and unnecessary regulating changes are avoided.

It is a further object of the present invention to provide a control system for positioning an electrode in an electric arc furnace in which the electrode motor is controlled by a regulating generator the terminal voltage of which is substantially zero when the furnace characteristics are at the desired regulated value.

It is also an object of the present invention to provide in a control system for an arc furnace, a regulating generator having inductively related control elements responsive to characteristics of the arc furnace.

It is also an object of the present invention to utilize, in an arc furnace control system, a regulating generator provided with a self-energizing field winding energized in accordance with the energization of such regulating generator.

It is also an object of the present invention to utilize, in an arc furnace control system a regulating generator having a shunt field circuit of a resistance such that the field resistance line lies to the left of the saturation curve.

It is a further object of the present invention to provide an arc furnace control system that has high amplification of and a fast response to a required corrective effort, but that will be unaffected by peak changes in momentary furnace characteristics.

It is also an object of this invention to provide an arc furnace control system that will effect melting and refining with less kilowatt hours per ton of steel than could be effected by prior art control systems.

Objects and advantages other than those above set forth will be apparent from the following description when read in connection with the accompanying drawing, in which.

Figure 1:
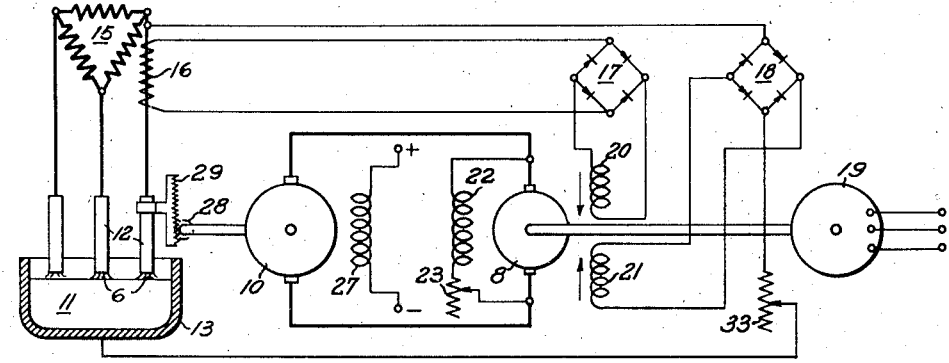
Fig. 1 is a schematic diagram of connections of one form of a control system embodying the present invention.

The invention is illustrated in Fig. 1 in the form in which it may be utilized in a control system for positioning the electrode in an arc furnace. The electrodes 12 of the furnace 11 are shown supplied with current from a transformer 7 having a secondary 15 connected to the electrodes and a primary 14 connected to any suitable alternating current supply line. The usual reactors and tap changers used with arc furnaces are omitted for simplicity of illustration. Each of the electrodes 12 is movable with respect to the "melt" or charge of material being refined which forms a common electrode for the arcs 6. Only the right hand electrode 12 has been illustrated as movable and the control system for such electrode only is shown. The other electrodes 12 are similarly movable and have a similar control system for each of such electrodes.

The electrode 12 is shown as having a rack 28 thereon cooperating with a gear 28 on the shaft of the electrode motor 10 to raise or lower the electrode as the motor 10 runs in one direction or the other. The motor 10 is illustrated as energized by a generator 8 driven by any suitable means such as the alternating current motor 19.

Movement of an electrode 12 toward or away from the melt is effected in response to the relative values of the current through the arc 6 at that electrode and the voltage across the arc. When the values of the arc current and the arc voltage have a predetermined relationship, the electrode is at the proper distance from the melt and the motor 10 is stopped. If the arc current or the arc voltage or both vary from the desired value, the electrode motor 10 is energized in the proper direction to raise or lower the electrode 12 in accordance with the corrective effort required.

Figures 3, 4:
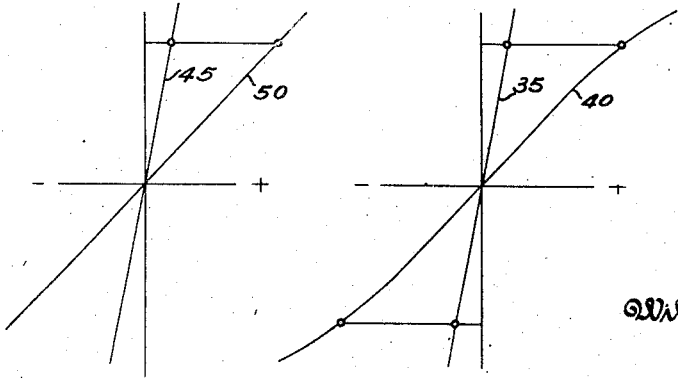
Figs. 3 and 4 are curves depicting characteristic features of the generators shown in Figs. 1 and 2.

The generator 8 has a self-energized field 22, the resistance of which is controlled by the adjustable resistance 23 so that the machine characteristics are as shown in Figs. 3 or 4. The characteristics of machine 8 are such that the field resistance line 45 or 35 lies to the left of the saturation curve 50 or 40. If greater accuracy is desired, the magnetic structure of the generator 8 is such that it operates only over the straight portion of the saturation curve 50. The terminal voltage of machine 8 will drop to zero if no excitation other than that provided by field 22 is present.

The exciting generator 8 has two control fields 20 and 21. These control fields 20 and 21 are inductively related to each other and are opposed as indicated by the arrows in Figs. 1 and 2. When the desired values of arc current and arc voltage are present in the furnace 11, the excitation provided by field 20 is equal and opposite to that provided by field 21 and the voltage of machine 8 thereupon drops to zero. The field 20 is connected to a bridge rectifier 17 energized by a current transformer 16 measuring the arc current through electrode 12. The field 21 is connected to a bridge rectifier 18 measuring the voltage across the arc 6 by connection to the furnace shell 13 and to the conductor leading to electrode 12. The desired relative values of arc current and arc voltage are controlled by the adjustable resistor 33 in the energizing circuit of the field 21. These desired relative values may be changed as the charge of cold scrap progresses to a molten body and is refined.

In an arc furnace control system, the regulating problem is unusual because of the high degree of instability of the electrical current and power in the arc. Violent fluctuations in arc current occur as often as every six cycles near the beginning of a melt in a steel furnace, due to the rapidity of changes in ionization, the varying degree of rectification in the arc and the varying arc length. Obviously, it is impractical to move an electrode system, weighing a ton or more, fast enough to correct for such variations by controlling the arc length. However, the variation in average values of arc current and arc voltage may vary from maximum to minimum every one to two seconds, due to the melting away of the metal and the melting of the electrode which changes the arc length. A good regulating system must hold these average values to a minimum variation.

The exciting generator 8 is recognized as a power amplifier, for the control power, supplied by the excess of one of fields 20 or 21 over the other, is a small percentage of the output delivered by machine 8 to the motor 10.

The improved regulation in an arc furnace control system embodying the present invention is due to several factors. The actuation of the electrode motor 10 is controlled by a measure of arc or heating energy, that is, for any given setting of the adjustable resistance 33 and the taps (not shown) on transformer 7, the control system will hold a predetermined value of voltage across and current in the arc 6. By controlling in response to the differential between a predetermined arc current and a predetermined arc voltage, a faster response, dependent upon the arc energy, is obtained than could be obtained from a response due to current alone.

The corrective effort is proportional to the deviation from normal of the regulated quantity. In other words, the speed of motor 10 in making any regulating change, changes in direct proportion to the change of the differential between current in and voltage across the arc 6. This provides a faster control action when considerable change is necessary, and necessitates only a short period of regulation when a small amount of regulation is required. This control action is especially effective in combination with a regulator responsive to arc current and arc voltage.

A change in an arc current is usually accompanied by an opposite change in arc voltage. As the present regulator is responsive to the differential between arc current and arc voltage, a rapid response to average value changes is obtained. As the windings 20 and 21 are inductively related and opposed, the mutual inductance thereof is effective in preventing response to momentary peak value transients. This is especially effective during the refining period after the metal is completely liquefied and the melt simulates boiling. Transient changes in arc current are caused by bubbles in the melt which soon disappear and therefore require no regulating change for correction.

The present control system is particularly effective in the three phase furnace shown. As the electrodes operate independently of each other, one electrode may bore down through the cold scrap and a cave-in of the metal around the electrode may occur. This causes substantially a short circuit and the current through the arc at that electrode suddenly increases with an accompanying decrease in voltage across that arc. The electrodes of the other two phases may at this instant have a proper arc length and therefore need no regulating action. However, the current through these electrodes will be affected because of the delta connection of the secondary 15 of transformer 7. If the present control should be responsive to current alone, an unnecessary regulating change would be called for on the other phases. In the present control system, due to the fact that the fields 20 and 21 are voltage responsive as well as current responsive, any unnecessary change on the other electrodes due to the cave-in on the third electrode, is avoided or minimized. This advantage is especially effective in that the present corrective effort is proportional to the deviation from normal of the regulated quantity.

The excitation provided by the shunt field 22 of generator 8 may be any predetermined percentage of the normal full load excitation, as long as the resistance lines 35 or 45 are to the left of the saturation curves 40 and 50 as shown in Figs. 3 and 4. In practice, values of shunt field excitation of from 15 to 25% of the ampere turns required for normal full load energization of motor 10, have been found to be satisfactory. This self-excited field 22 has two functions. First, the required energization supplied by the excess of one of fields 20 and 21 over the other can be decreased and therefore these fields are more sensitive to the needed correction. The self-excited field 22 permits the voltage of machine 8 to rise to normal value more quickly than if such field were not provided and further causes the voltage across the motor 10 to decay less rapidly than if such shunt field were not provided. The rapid rise of voltage is desirable from the standpoint of obtaining fast response to a needed corrective change. A fast response is especially desirable when the electrode 12 bores down through the scrap in the furnace 11 and such scrap caves in on the electrode.

Figure 2:
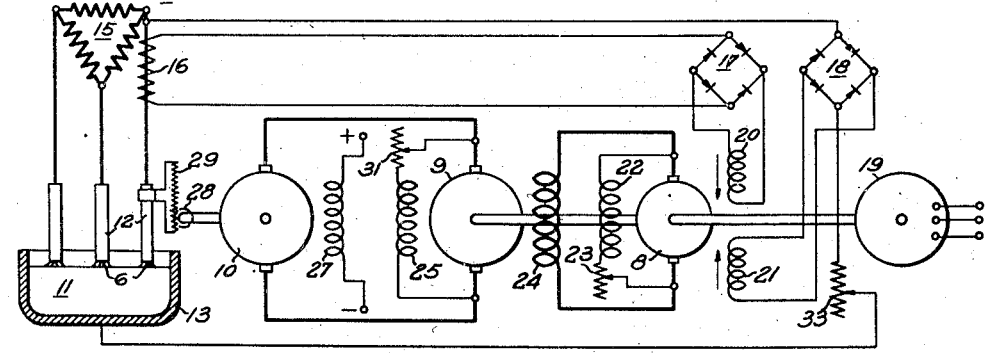
Fig. 2 is a schematic diagram of connections illustrating a modification of the control system shown in Fig. 1.

In the modification shown in Fig. 2, an added stage of amplification has been provided by the generator 9. In this modification the generator 8 supplies the field 24 of generator 9 and is controlled by its fields 20, 21 and 22 as in the embodiment shown in Fig. 1. The generator 9 supplies the armature energization for the motor 10 and has a self-energized field 25. The field circuit of field 25 includes a resistance 31 of a value such that the field resistance line 35 will lie to the left of the saturation curve 40 as shown in Fig. 4.

An operation of the control system shown in Fig. 2 is initiated in a manner similar to an operation of the system shown in Fig. 1. The required corrective effort is first amplified by the output of generator 8 and is again amplified as this change in energization is applied to the motor 10 through the generator 9. The terminal voltages of both generators 8 and 9 immediately drop to zero when the net energization of fields 20 and 21 is zero. The self-energized field 25 of the generator 9 functions in a manner similar to the self-energized field 22 of generator 8 in making the generator 9 more sensitive to the needed correction and in providing for a rapid rise of the voltage supplied to the motor 10.

Other uses of the regulating control of the present invention will be apparent to those skilled in this art. Such a control system has great utility in any "positioning" control or in any control system where the voltage of the regulating generator is at a constant value for a predetermined constant normal value of the regulated quantity.

This application is a continuation in part of application Serial No. 486,048, filed May 7, 1943, with Terryl B. Montgomery, William M. Pickslay, and Harold E. Reichert, named as joint inventors, which application matured May 1, 1945, into U. S. Patent No. 2,375,039, in the name of Harold E. Reichert.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system for an electric arc furnace provided with relatively movable electrodes adapted to have an arc drawn therebetween, motor means for moving one of said electrodes, means for controlling said motor means comprising a dynamoelectric machine provided with two opposed inductively related field windings, means connecting one of said field windings responsively to the current through said arc, means connecting the other of said field windings responsively to the voltage across said arc, and a self-energizing field winding on said dynamoelectric machine connected to be energized in accordance with the energization of said dynamoelectric machine.

2. In a control system for an electric arc furnace provided with a plurality of pairs of relatively movable electrodes each adapted to have an arc drawn therebetween, a polyphase transformer for supplying current of one phase to one of said pairs of electrodes and current of a different phase to another of said pairs of electrodes, a plurality of motor means, each operable to move one of said electrodes, a plurality of means, each comprising a generator connected to control the supply of current to one of said motor means and each provided with two field windings, means for connecting one of said field windings of each of said generators responsively to the current through the arc at the electrode associated therewith, means connecting the other of said field windings of each of said generators responsively to the voltage across the arc at the electrodes associated therewith and a self-energizing field winding on each of said generators connected to be energized in accordance with the energization thereof.

3. In a control system, an electrical device, a control element associated with said device and adapted to control a characteristic of the operation thereof, a variable voltage dynamoelectric machine comprising an armature operatively connected to said control element, a field for said dynamoelectric machine having energizing means connected in shunt circuit to said armature, auxiliary field means for said dynamoelectric machine having energizing means operatively responsive to a predetermined change in said characteristic, and means comprising a predetermined established relation between the saturation curve and the field resistance line of said dynamoelectric machine whereby the terminal voltage of said dynamoelectric machine is substantially zero when the energizing effect of said auxiliary field means is zero at the normal regulated value of said characteristic.

4. In combination, a movable member, a motor for positioning said member, a regulating generator for controlling the energization of said motor, said generator operating on a substantially straight portion of the saturation curve thereof, a field winding on said generator connected in shunt with the armature thereof, means for establishing the resistance of said shunt circuit so that the field resistance line of said generator lies to the left of said saturation curve whereby the terminal voltage of said generator is substantially zero when said field only is supplying excitation to said generator, and auxiliary field means on said generator energized responsively to a characteristic of movement of said movable member.

5. In a furnace regulator system, a movable electrode, a regulator for governing the operation of said electrode and comprising an electrode motor, a generator for supplying energy thereto in either of two polarities for operating the motor in either of two directions, said generator having a plurality of control field windings energized in accordance with the electrical conditions of the electrode circuit, and said generator also having a self-energizing field winding energized in accordance with the energization of said generator.

6. In a furnace regulator system, the combination with a movable electrode, and a motor for operating the electrode, of means for governing the operation of said motor to maintain a substantially constant arc, said means comprising a generator continuously connected to said motor and provided with oppositely energized control field windings, means for energizing one of said pair of control field windings with a current that is a measure of the current flowing through the arc, means for energizing the other one of said pair of field windings with a current that is a measure of the voltage across the arc, and a self-energizing field winding on said generator connected to be energized in accordance with the output voltage of said generator.

7. In a furnace regulator system, the combination with a movable electrode, and a motor for operating the electrode, of means for governing the operation of said motor to maintain a substantially constant arc, said means comprising a generator continuously connected to said motor and provided with oppositely energized control field windings, means for energizing one of said pair of control field windings with a current that is a measure of the current flowing through the arc, means for energizing the other one of said pair of field windings with a current that is a measure of the voltage across the arc, and a self-energizing field winding on said generator connected to be energized in accordance with the energization of said generator.

8. In combination, a movable member, a motor for positioning said member, a regulating generator for controlling the energization of said motor, field winding means on said generator connected to be energized in degree and direction dependent upon the value and direction of the terminal voltage of said generator, means for establishing the circuit resistance of said field winding means so that the field resistance line of said generator lies to the left of the saturation curve thereof, whereby said terminal voltage of said generator returns to zero when said field winding means only is supplying excitation to said generator, and auxiliary field means on said generator energized responsively to a characteristic of movement of said movable member.

9. In an electric furnace regulator system, a movable electrode connected in an electrode energizing circuit, a regulator for governing the movement of said electrode and comprising an electrode motor, a generator for supplying energy to said motor in either of two polarities for operating said motor in either of two directions, said generator having a plurality of control field windings energized in accordance with electrical conditions of said electrode energizing circuit, and said generator also having field winding means energized in degree and direction dependent upon the value and direction of the voltage output of said generator.

10. In a control system for an electric arc furnace provided with relatively movable electrodes adapted to have an arc drawn therebetween, motor means for moving one of said electrodes, means for controlling said motor means comprising a dynamoelectric machine provided with a plurality of inductively related field windings, means connecting one of said field windings responsively to the current through said arc, means connecting another of said field windings responsively to the voltage across said arc, and additional field winding means on said dynamoelectric machine connected to be energized in degree and direction dependent upon the value and direction of the voltage output of said dynamoelectric machine.

11. In a control system for an electric arc furnace provided with relatively movable electrodes adapted to have an arc drawn therebetween, motor means for moving one of said electrodes, means for controlling said motor means comprising a dynamoelectric machine provided with a plurality of inductively related field windings, means connecting one of said field windings responsively to the current through said arc, means connecting another of said field windings responsively to the voltage across said arc, and additional field winding means on said dynamoelectric machine connected in shunt circuit to the armature thereof.

12. In a control system for an electric arc furnace provided with relatively movable electrodes adapted to have an arc drawn therebetween, motor means for moving one of said electrodes, a generator for supplying current to said motor, means for controlling said generator comprising a dynamoelectric machine provided with two opposed inductively related field windings, means connecting one of said field windings responsively to the current through said arc, means connecting the other of said field windings responsively to the voltage across said arc, and a self-energizing field winding on said dynamoelectric machine connected to be energized in accordance with the energization of said dynamoelectric machine.

13. In a control system for an electric arc furnace provided with relatively movable electrodes adapted to have an arc drawn therebetween, motor means for moving one of said electrodes, a generator for supplying current to said motor, a field for said generator having energizing means connected in shunt circuit to the armature thereof, the resistance of said shunt circuit having a predetermined value such that the field resistance line lies to the left of the saturation curve thereof, means for controlling said generator comprising a dynamoelectric machine provided with two opposed inductively related field windings, means connecting one of said field windings responsively to the current through said arc, and means connecting the other of said field windings responsively to the voltage across said arc.

14. In a control system for an electric arc furnace provided with relatively movable electrodes adapted to have an arc drawn therebetween, motor means for moving one of said electrodes, a generator for supplying current to said motor, a field for said generator having energizing means connected in shunt circuit to the armature thereof, the resistance of said shunt circuit having a predetermined value such that the field resistance line lies to the left of the saturation curve thereof, means for controlling said generator comprising a dynamoelectric machine provided with a field having energizing means connected in shunt circuit to the armature thereof, the resistance of said shunt circuit having a predetermined value such that the field resistance line lies to the left of the saturation curve thereof, said means for controlling said generator also comprising two opposed inductively related field windings, means connecting one of said field windings responsively to the current through said arc, and means connecting the other of said field windings responsively to the voltage across said arc.

15. In a control system for an electric arc furnace provided with a plurality of pairs of relatively movable electrodes each adapted to have an arc drawn therebetween, a polyphase transformer for supplying current of one phase to one of said pairs of electrodes and current of a different phase to another of said pairs of electrodes, a plurality of motor means, each operable to move one of said electrodes, a plurality of supply generators connected to supply current to said motor means, a plurality of means, each comprising a regulating generator connected to control the supply of current from one of said supply generators to one of said motor means and each provided with two field windings, means for connecting one of said field windings of each of said regulating generators responsively to the current through the arc at the electrode associated therewith, means connecting the other of said field windings of each of said regulating generators responsively to the voltage across the arc at the electrode associated therewith, and a shunt field winding on said regulating generator.

16. In a control system, an electrical device, a control element associated with said device and adapted to control a characteristic of the operation thereof, a generator for supplying electrical energy for operation of said control element, a variable voltage dynamoelectric machine comprising an armature operatively connected to said generator, a field for said dynamoelectric machine having energizing means connected in shunt circuit to said armature, auxiliary field means for said dynamoelectric machine having energizing means operatively responsive to a predetermined change in said characteristic, and means comprising a predetermined established relation between the saturation curve and the field resistance line of said dynamoelectric machine whereby the terminal voltage of said dynamoelectric machine is substantially zero when the energizing effect of said auxiliary field means is zero at the normal regulated value of said characteristic.

17. In combination, a movable member, a motor for positioning said member, a supply generator for energizing said motor, a regulating generator for controlling the energization of said supply generator, said regulating generator operating on a substantially straight portion of the saturation curve thereof, a field winding on said regulating generator connected in shunt with the armature thereof, means for establishing the resistance of said shunt circuit so that the field resistance line of said regulating generator lies to the left of said saturation curve whereby the terminal voltage of said regulating generator is substantially zero when said field only is supplying excitation to said regulating generator, and auxiliary field means on said regulating generator energized responsively to a characteristic of movement of said movable member.

18. In a furnace regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, and a self-energizing field winding connected to be energized in accordance with the output voltage of the exciter generator for increasing the rate of voltage change thereof.

19. In a furnace regulator system, a movable electrode, a regulator for governing the operation of said electrode and comprising an electrode motor, a main generator for supplying energy thereto in either of two polarities for operating the motor in either of two directions, and an exciter generator having a plurality of control field windings energized in accordance with the electrical conditions of the electrode circuit, and a self-energizing field winding energized in accordance with the energization of said exciter generator.

20. In a furnace regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding energized in accordance with the energization of said exciter generator.

21. In a furnace regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding connected to be energized in accordance with the output voltage of the exciter for increasing the rate of voltage change thereof.

22. In a control system for an electric arc furnace provided with a plurality of pairs of relatively movable electrodes each adapted to have an arc drawn therebetween, a polyphase current source for supplying current of one phase to one of said pairs of electrodes and current of a different phase to another of said pairs of electrodes, a plurality of motor means, each operable to move one of said electrodes, a plurality of supply generators connected to supply current to said motor means, a plurality of means, each comprising a regulating generator connected to control the supply of current from one of said supply generators to one of said motor means and each provided with two field windings, means for connecting one of said field windings of each of said regulating generators responsively to the current through the arc at the electrode associated therewith, means connecting the other of said field windings of each of said regulating generators responsively to the voltage across the arc at the electrode associated therewith, and a shunt field winding on said regulating generator.

23. In a furnace regulator system, the combination with a movable electrode and a motor for operating the electrode, of means for governing the operation of said motor to maintain a substantially constant arc, said means comprising a source of energy continuously connected to said motor and including a generator provided with oppositely energized control field windings, means for energizing one of said pair of control field windings with a current that is a measure of the current flowing through the arc, means for energizing the other of said pair of field windings with a current that is a measure of the voltage across the arc, and a self-energizing field winding on said generator connected to be energized in accordance with the output voltage of said generator for increasing the rate of voltage change thereof.

24. In a furnace regulator system, a movable electrode, a regulator for governing the operation of said electrode and comprising an electrode motor, a source for supplying energy to said electrode motor in either of two polarities for operating said motor in either of two directions, said source including a generator having a plurality of control field windings energized in accordance with the electrical conditions of the electrode circuit, and said generator also having a self-energizing field winding energized in accordance with the energization of said generator.

25. In a furnace regulator system, the combination with a movable electrode, and a motor for operating the electrode, of means for governing the operation of said motor to maintain a substantially constant arc, said means comprising a generator continuously connected to control said motor and provided with oppositely energized control field windings, means for energizing one of said pair of control field windings with a current that is a measure of the current flowing through the arc, means for energizing the other one of said pair of field windings with a current that is a measure of the voltage across the arc, and a self-energizing field winding on said generator connected to be energized in accordance with the energization of said generator, 26. In a control system for an electric arc furnace provided with relatively movable electrodes adapted to have an arc drawn therebetween, motor means for moving one of said electrodes, means for controlling said motor means comprising a dynamoelectric machine provided with two opposed inductively related field windings, means connecting one of said field windings responsively to the current through said arc, means connecting the other of said field windings responsively to the voltage across said arc, and a self-energizing field winding on said dynamoelectric machine connected to be energized in accordance with the energization of said dynamoelectric machine.

27. In a control system for an electric arc furnace provided with a plurality of pairs of relatively movable electrodes each adapted to have an arc drawn therebetween, a polyphase current source for supplying current of one phase to one of said pairs of electrodes and current of a different phase to another of said pairs of electrodes, a plurality of motor means, each operable to move one of said electrodes, a plurality of means, each comprising a generator connected to control the supply of current to one of said motor means and each provided with two field windings, means for connecting one of said field windings of each of said generators responsively to the current through the arc at the electrode associated therewith, and means connecting the other of said field windings of each of said generators responsively to the voltage across the arc at the electrode associated therewith.

WILLIAM M. PICKSLAY.

REFERENCES CITED

The following references are of record in the file of this patent:

UNITED STATES PATENTS

| Number | Name | Date |
|---|---|---|
| 1,989,546 | Chapman | Jan. 29, 1935 |
| 2,007,751 | Chapman | July 9, 1935 |
| 2,221,610 | Santini | Nov. 12, 1940 |
| 2,295,395 | Formhals | Sept. 8, 1942 |

FOREIGN PATENTS

| Number | Country | Date |
|---|---|---|
| 373,735 | Great Britain | June 2, 1932 |
| 629,620 | France | Aug. 1, 1927 |

OTHER REFERENCES

"Westinghouse Eng'r.," May 1942 (reprint), page 122.

A. I. E. E. Technical Paper 43–96, May 1943, page 3.

Disclaimer 2,450,159.—*William M. Pickslay*, Milwaukee, Wis. CONTROL SYSTEM. Patent dated Sept. 28, 1948. Disclaimer filed Mar. 26, 1949, by the assignee, *Allis-Chalmers Manufacturing Company*.

Hereby enters this disclaimer to claim 27 of said patent.

[*Official Gazette May 10, 1949.*]